(12) United States Patent
Landmesser

(10) Patent No.: US 6,471,284 B2
(45) Date of Patent: Oct. 29, 2002

(54) REAR END CLOSURE ASSEMBLY FOR AN AUTOMOTIVE VEHICLE

(75) Inventor: Franklin Darrel Landmesser, Troy, MI (US)

(73) Assignee: General Motors Corporation, Detroit, MI (US)

( * ) Notice: Subject to any disclaimer, the term of this patent is extended or adjusted under 35 U.S.C. 154(b) by 18 days.

(21) Appl. No.: 09/798,653

(22) Filed: Mar. 5, 2001

(65) Prior Publication Data

US 2002/0121798 A1 Sep. 5, 2002

(51) Int. Cl.$^7$ .................................................. B60J 5/10
(52) U.S. Cl. ...................................... 296/146.8; 296/56
(58) Field of Search ........................ 296/146.8, 146.13, 296/50, 51, 56

(56) References Cited

U.S. PATENT DOCUMENTS

| | | | | |
|---|---|---|---|---|
| 3,713,472 A | * | 1/1973 | Dozois | 296/146.8 |
| 3,749,440 A | * | 7/1973 | Lathers | 296/50 |
| 3,815,950 A | * | 6/1974 | McKenzie et al. | 296/56 |
| 4,184,709 A | | 1/1980 | Kim | 296/137 |
| 4,413,854 A | * | 11/1983 | Hirshberg | 296/146.8 |
| 4,609,027 A | * | 9/1986 | Keller | 160/193 |
| 5,013,082 A | | 5/1991 | Landmesser | 296/202 |
| 5,992,918 A | | 11/1999 | Gobart et al. | 296/147.13 |
| 6,007,139 A | | 12/1999 | Shave | 296/146.8 |
| 6,068,327 A | * | 5/2000 | Junginger | 296/146.13 |
| 6,174,015 B1 | * | 1/2001 | Shave | 296/56 |

* cited by examiner

*Primary Examiner*—D. Glenn Dayoan
*Assistant Examiner*—Lori L Coletta
(74) *Attorney, Agent, or Firm*—Laura C. Hargitt

(57) ABSTRACT

A rear end closure assembly for selectively opening and closing a rear passageway of an automotive vehicle is disclosed. The closure assembly includes a first panel and a second panel attached to each other using rotatable members and a torque bar such that the second panel can be raised to a juxtaposed vertical relation relative to the first panel to partially open the rear passageway. Thereafter, the first and second panels are upwardly rotated together to fully open the rear passageway.

5 Claims, 4 Drawing Sheets

US 6,471,284 B2

REAR END CLOSURE ASSEMBLY FOR AN AUTOMOTIVE VEHICLE

TECHNICAL FIELD

The present invention relates to a rear end closure assembly for an automotive vehicle.

BACKGROUND OF THE INVENTION

It is known in a variety of automotive vehicles to employ hinged closure panels for providing access to the cabin of the vehicle through a rear passageway of the vehicle. It is also known that the panels are typically hinged along one of their edges for rotation about an axis substantially coincidental with such edge. Such hinged closure panels, thus, require clearance space into which the closure may pivot to an open or closed position, thereby limiting the practical location where such vehicles can be used. Therefore, it is desirable to provide a rear end closure assembly that can be selectively opened and closed in a stable manner while requiring reduced clearance space for operation.

SUMMARY OF THE INVENTION

The present invention meets the need in the art by providing, a rear end closure assembly for selectively opening and closing a rear passageway of an automotive vehicle. The closure assembly includes a linkage for coupling a first closure panel with a second closure panel in a manner that permits the second closure panel to partially orbit around the first closure panel, while being maintained in a substantially vertical orientation. The first and second panels each include a first side edge and a second side edge and a top edge and a bottom edge wherein the first side edge and second side edge of the first closure panel are respectively substantially aligned with the first side edge and second side edge of the second closure panel when the panels are in their closed position. The linkage includes a first and second rigid member pivotally attached to the first closure panel respectively at locations along the first and second side edge of the first closure panel and to the second closure panel respectively at locations along the first and second side edge of the second closure panel. The linkage further includes a transversely disposed torque bar pivotally attached to the second closure panel and having a third and fourth rigid member attached to the transversely disposed bar projecting away from the transversely disposed bar for pivotally mounting proximate to the bottom edge of the first closure panel. Advantageously, the first, second, third and fourth members are configured so that the second closure panel, while being maintained in a substantially vertical position, can be moved away from the first closure panel and then partially orbited in a stable manner relative to the first closure panel to bring the first panel and the second panel in substantially juxtaposed vertical relation to each other.

BRIEF DESCRIPTION OF THE DRAWINGS

These and other objects, features, aspects, and advantages of the invention will become apparent upon consideration of the specification and appended drawings in which.

DESCRIPTION OF PREFERRED EMBODIMENT

Figure 1:
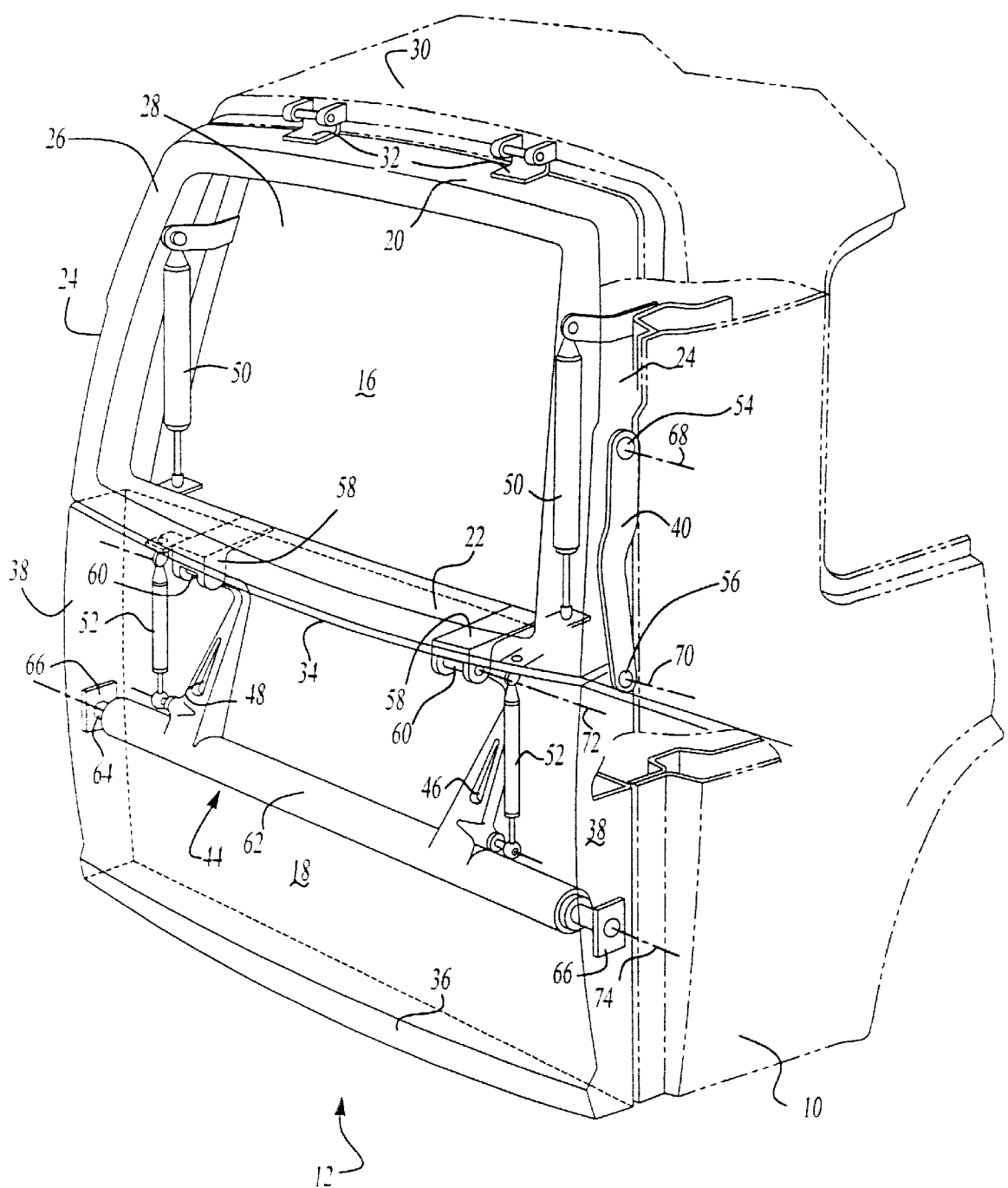
FIG. 1 illustrates a perspective view of a rear end closure assembly for an automotive vehicle in a closed position.

Referring now to FIGS. 1 through 4, there is illustrated a vehicle 10 having a rear end closure assembly 12 for selectively opening and closing a rear passageway 14 of the vehicle 10. The rear end closure assembly 12 includes a first closure panel 16 and a second closure panel 18 attached to each other in a manner that allows the second closure panel 18 to be partially orbited relative to the first closure panel 16 to bring the first panel 16 and the second panel 18 into substantially juxtaposed vertical relation to each other when opened.

The first panel 16 is generally four sided with a top edge 20, bottom edge 22, and a pair of side edges 24. The panel 16 includes a frame 26 supporting a window 28. The panel 16 is rotatably attached to a roof portion 30 of the vehicle 10 using suitable hinges 32.

The second panel 18 is also generally four sided with a top edge 34, a bottom edge 36 and a pair of side edges 38.

The first panel 16 is attached to the second panel 18 with a linkage that includes first and second elongated rigid members 40, 42 for securing the first and second panels 16, 18 together; a pivotal torque bar assembly having a torque bar 44 attached to third and fourth elongated members 46, 48 for facilitating orbital motion of the second panel 18 relative to the first panel 16; and a plurality of gas struts 50, 52 for regulating the rate at which the panels 16, 18 are opened or closed.

The first rigid member 40 is laterally spaced apart from the second rigid member 42 and each member 40, 42 includes a first through-hole at a first end of the member 40, 42 for receiving a pin 54 for pivotal attachment to each of the side edges 24 of the first panel 16, and a second through-hole at a second end of the member 40 for receiving a pin 56 for pivotal attachment to each of the side edges 38 of the second panel 18.

The third elongated member 46 is laterally spaced apart form the fourth elongated member 48 and each member 46, 48 is arcuate and configured for attachment to a pair of brackets 58 associated with the first panel 16. As shown, the members 46, 48 include cylindrical bars 60 integrally attached to one end of the member 46, 48 and extending generally perpendicular to the members 46, 48 and the bars 60 are rotatably received in the brackets 58 that are attached (e.g., welded) to the lower edge 22 of the first panel 16. The third and fourth members 46, 48 are also integrally attached to a cylindrical outer portion (e.g., shell) 62 of the torque bar 44. The outer portion 62 is rotatable about an inner portion (e.g., a rod) 64 of the torque bar 44. The inner portion 64 is fixed at its ends to the side edges 38 of the second panel 18. The torque bar 44 extends transversely across the second panel 18 and is positioned at a location approximately midway between the top and bottom edges 34, 36 of the second panel 18. The inner rod 64 of the torque bar 44 is secured in cavities of reinforcement members 66 that are attached to the side edges 38 of the second panel 18.

The gas struts 50, 52 are of the type conventionally used to support a closure panel of an automotive vehicle. A first pair of struts 50 is rotatably attached with brackets or otherwise adjacent the side edges 24 of the first panel 16 to a portion of the vehicle and attached to the first panel 16 adjacent the lower edge 22 of the panel 16. A second pair of struts 52 is rotatably attached with brackets or otherwise to the upper edge 34 of the second panel 18 and to the third and fourth members 46, 48 adjacent the torque bar 44.

In FIG. 1, the rear closure assembly 12 is closed and one side edge 24 of the first panel 16 aligns with one side edge 38 of the second panel 18 adjacent one side of the vehicle while another side edge 24 of the first panel 16 aligns with the remaining side edge 38 of the second panel 18 adjacent another side of the vehicle.

Figure 2:
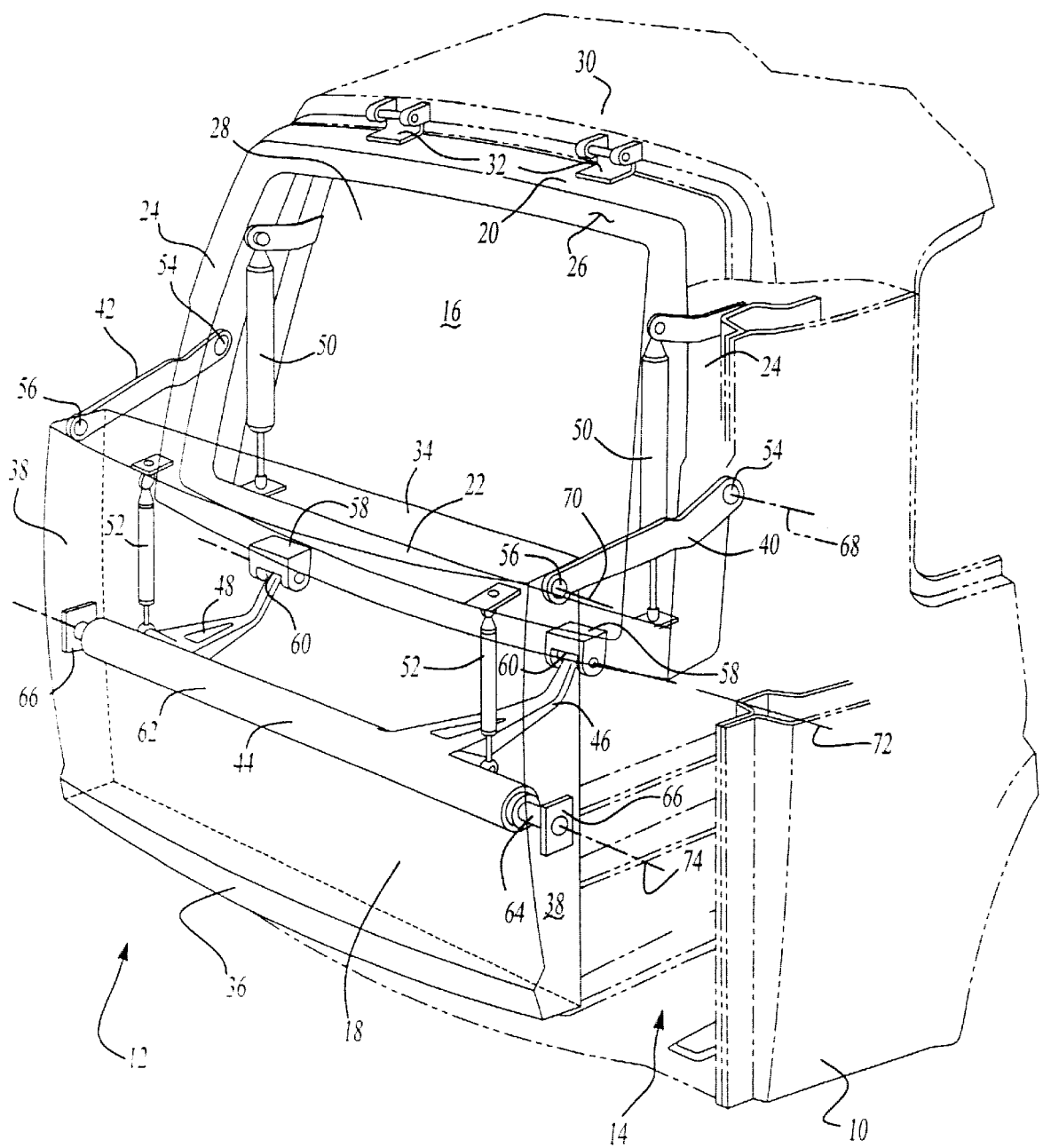
FIG. 2 illustrates a perspective view of the rear end closure assembly of FIG. 1 in a first partially opened position.
Figure 3:
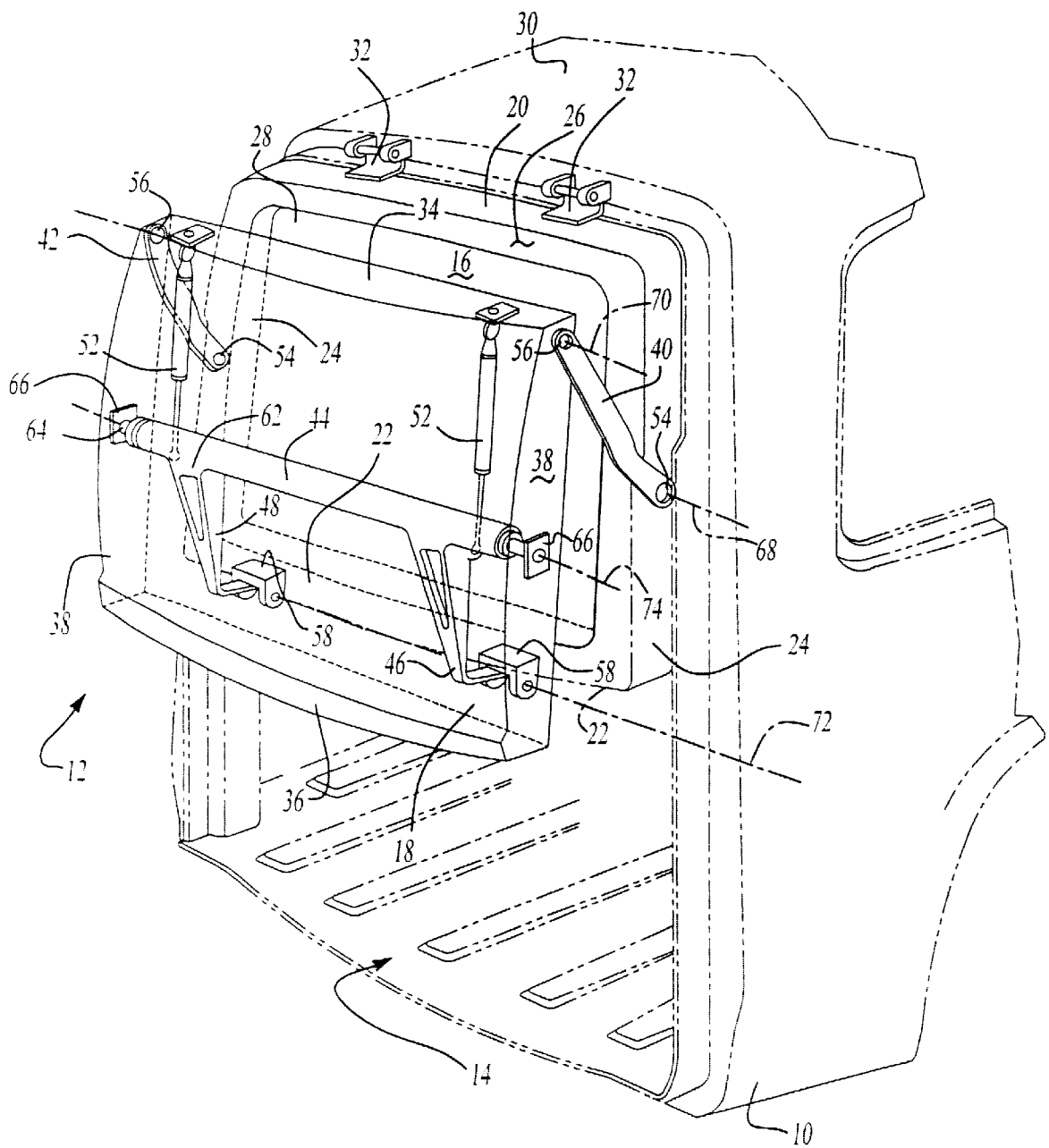
FIG. 3 illustrates a perspective view of the rear end closure assembly of FIG. 1 in a second partially opened position.
Figure 4:
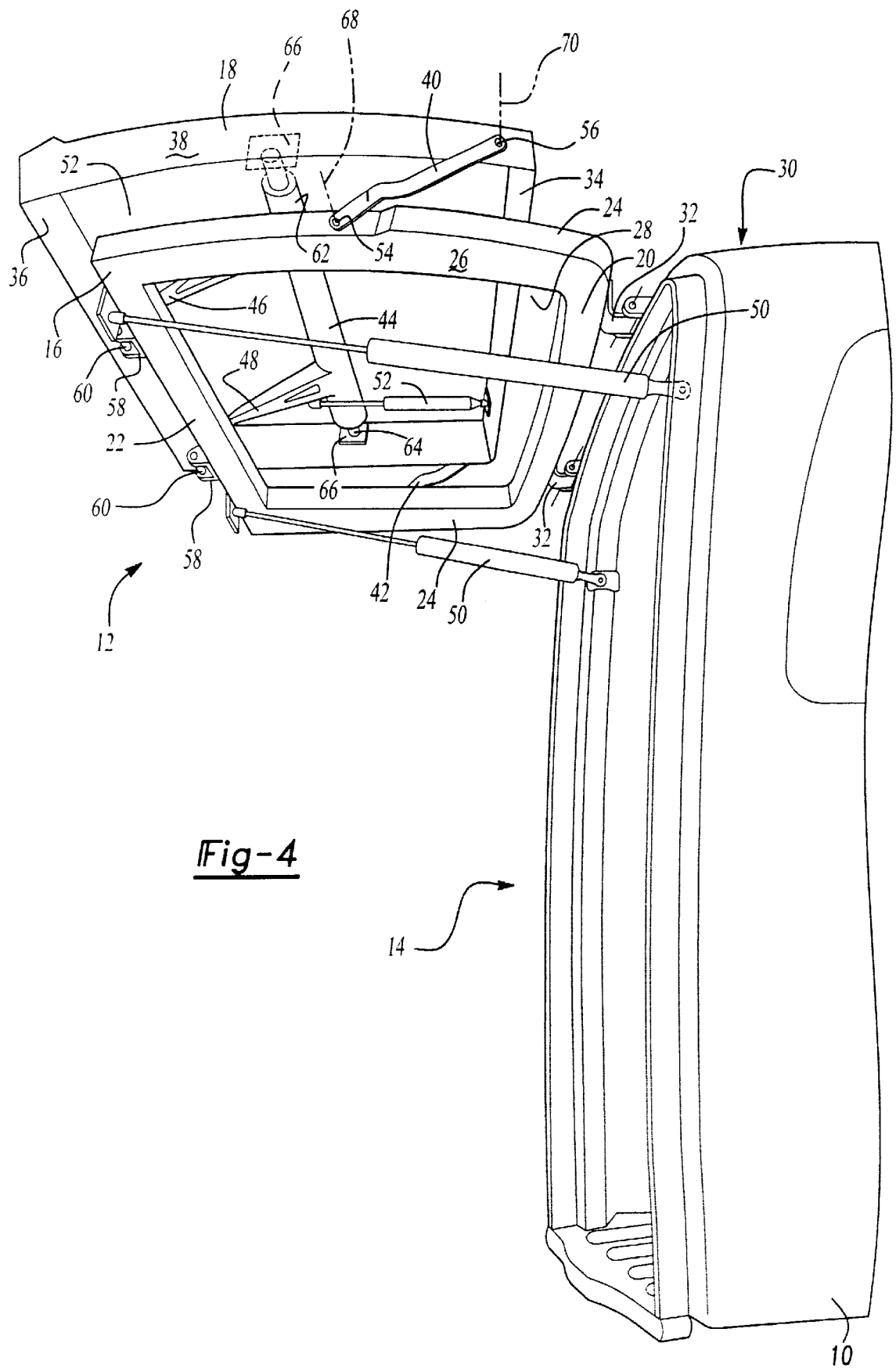
FIG. 4 illustrates a perspective view of the rear end closure assembly of FIG. 1 in a third opened position.

To access the rear passageway 14, the second panel 18, while being maintained in a substantially vertical position, is moved away from the first closure panel 16 and a floor portion of the vehicle 10 and is then partially orbited relative to said first panel 16 to bring the first panel 16 and the second panel 18 in substantially juxtaposed vertical relation to each other thereby partially opening the passageway 14, as shown in FIGS. 2 and 3. Thereafter, the first and second panels 16, 18 are upwardly rotated together to fully open the passageway 14 as shown in FIG. 4.

More specifically, to raise the second panel 18 to oppose the first panel 14, a longitudinal and then upward force is applied to the lower edge 36 of the second panel 18 to move the second panel 18 away from the vehicle 10 and then upwardly. As the second panel 18 is raised to oppose the first panel 16, the first and second members 40, 42 rotate about a first axis 68 and a second axis 70. Furthermore, as the second panel 18 is raised, the third and fourth members 46, 48 rotate about a third axis 72 and a fourth axis 74.

Advantageously, the axes 68, 70, 72, 74 of rotation of the members 40, 42, 46, 48 are spaced apart to assist in providing the second panel 18 with stability as it moves to oppose the first panel 16. As shown, the first axis 68 is located about midway along the side edges 24 of the first panel 16 and the third axis 72 is located adjacent the lower edge 22 of the first panel 16. Furthermore, the second axis 70 is located adjacent the upper edge 34 of the second panel 18 while the fourth axis 74 is located midway across the side edges 38 of the second panel 18. Additionally, the torque bar 44 also assists in stabilizing the second panel 18 as it moves to oppose the first panel 16 and the torque bar 44 assists in coordinating the motions of the first, second, third and fourth members 40, 42, 46, 48.

The struts 52 push upon the members 46, 48 and upon the top edge 34 of the second panel 18, thereby, initiating a torque upon the members 46, 48 that assists in rotating the outer shell 62 of the torque bar 44 and the members 46, 48 about both the inner rod 64 of the torque bar 44 and about the fourth axis 74. Thus, the struts assist in raising the second panel 18.

To rotatably raise the first and second panels 16, 18 to fully open the passageway 14 of the vehicle 10, as shown in FIG. 4, a force is introduced upon the bottom edge 22 of the first panel 16 away from and upwardly with respect to the vehicle 10 such that the first and second panels 16, 18 rotate about the hinges 32 to fully open the passageway 14. The struts 50 push upon the vehicle and upon the first panel 16 thereby assisting in rotating the panels 16, 18 about the hinges 32.

It shall be recognized that the first and second panels 16, 18 may be formed of a variety of materials and that the second panel 18 may be fitted with trim having openings such that the trim at least partially conceals the torque bar 44 and the third and fourth members 46, 48 when the assembly 12 is closed and such that the member 46, 48 can selectively extend through the openings in the trim as the second panel 18 is raised to oppose the first panel 16. Furthermore, the first or second panel 16, 18 may include latch or lock mechanisms. The panels 16, 18 may be formed of steel, plastic or a combination thereof. One or more of the panels 16, 18 may be fully integrated glass panel or opaque panel. The closure assembly 12 or panels 16, 18 may include one or more other attachments such as license plate holders, lights, spare tires or other hardware. Additionally, components of the assembly 12 may be integrated or separated as needed or desired.

It should be understood that the invention is not limited to the exact embodiment or construction, which has been illustrated and described but that various changes may be made without departing from the spirit and the scope of the invention.

What is claimed is:

1. A rear end closure assembly for selectively opening and closing a rear passageway of an automotive vehicle, comprising:

a) an automotive vehicle body having a roof portion, a floor portion, a first side and a second side;

b) a first closure panel having a top edge, a bottom edge, a first side edge and a second side edge, and being hingedly connected along its top edge to said vehicle body proximate said roof portion;

c) a second closure panel having a top edge, a bottom edge, a first side edge and a second side edge, and being moveably coupled to said first closure panel so that said first side edge and said second side edge of said first closure panel and said first side edge and said second side edge of said second closure panel are substantially aligned with each other when said panels are in their closed position; and d) a linkage for coupling said first closure panel with said second closure panel and for permitting said second closure panel to partially orbit around said first closure panel, while being maintained in a substantially vertical orientation; said linkage including i. a first rigid member pivotally attached at one end to said first closure panel at a location along said first side edge of said first closure panel; said first rigid member also being pivotally attached at another end to said second closure panel at a location along said first side edge of said second closure panel;

ii. a second rigid member pivotally attached at one end to said first closure panel at a location along said second side edge of said first closure panel; said second rigid member also being pivotally attached at another end to said second closure panel at a location along said second side edge of said second closure panel;

iii. a transversely disposed torque bar pivotally attached to said second closure panel and having a third and fourth rigid members, each with a first end attached to said transversely disposed bar and a second end projecting away from said transversely disposed bar for pivotally mounting proximate to said bottom edge of said first closure panel;

said first, second, third and fourth members being configured so that said second closure panel, while being maintained in a substantially vertical position, can be moved away from said first closure panel and then partially orbited relative to said first closure panel to bring said first panel and said second panel in substantially juxtaposed vertical relation to each other.

2. A rear end closure assembly as in claim 1 wherein said first and second members are rotatable about a first axis and a second axis and said third and fourth members are rotatable about a third axis and fourth axis wherein the first axis is spaced apart from the third axis and the second axis is space apart from the third axis.

3. A rear end closure assembly as in claim 1, further comprising a first gas strut and a second gas strut for assisting in moving said first and second panels into juxtaposed relation to each other, said first and second gas struts attached to said top edge of said second panel and respectively to said third and fourth rigid members.

4. A rear end closure assembly as in claim 1, further comprising:

a pair of gas struts for assisting in rotating said first and second panels about hinges that hingedly connect said first panel to said roof portion, said gas struts rotatably attached to said vehicle and said first panel.

5. A rear end closure assembly as in claim 1, wherein said torque bar is attached to said first and second side edges of said second panel.

* * * * *